United States Patent
Gur et al.

(10) Patent No.: US 10,817,083 B2
(45) Date of Patent: Oct. 27, 2020

(54) DETECTION OF PEN LOCATION RELATIVE TO AN ELECTRONIC DEVICE

(71) Applicant: Microsoft Technology Licensing, LLC, Redmond, WA (US)

(72) Inventors: Arie Y. Gur, Kiryat Ono (IL); Amir Zyskind, Tel Aviv (IL); Vadim Mishalov, Tel Aviv (IL); Adam Benjamin Meshi, Herzliya (IL); Felix Chazanovich, Jerusalem (IL); On Haran, Kfar Saba (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/125,649

(22) Filed: Sep. 7, 2018

(65) Prior Publication Data

US 2020/0081552 A1 Mar. 12, 2020

(51) Int. Cl.
*G06F 3/038* (2013.01)
*G06F 3/0354* (2013.01)
*G06F 3/041* (2006.01)

(52) U.S. Cl.
CPC .......... *G06F 3/038* (2013.01); *G06F 3/03545* (2013.01); *G06F 3/0416* (2013.01); *G06F 2203/04108* (2013.01)

(58) Field of Classification Search
USPC ........... 345/179, 173, 177; 178/18.04, 19.02, 178/19.07
See application file for complete search history.

(56) References Cited

U.S. PATENT DOCUMENTS

| 9,652,058 | B2 | 5/2017 | Watanabe | |
|---|---|---|---|---|
| 2008/0099254 | A1 | 5/2008 | Katsurahira | |
| 2008/0181501 | A1* | 7/2008 | Faraboschi | G06F 40/174 382/179 |
| 2014/0118308 | A1* | 5/2014 | Rhee | G06F 3/0383 345/177 |
| 2016/0054835 | A1* | 2/2016 | Heo | G06F 3/0412 345/173 |

(Continued)

FOREIGN PATENT DOCUMENTS

| EP | 2662759 A2 | 11/2013 |
|---|---|---|
| WO | 0022567 A1 | 4/2000 |

(Continued)

OTHER PUBLICATIONS

"International Search Report and Written Opinion Issued in PCT Application No. PCT/US2019/038853", dated Sep. 9, 2019, 12 Pages.

*Primary Examiner* — Deeprose Subedi

(57) ABSTRACT

Signals are transmitted from a plurality of regions of an electronic device. Location information is then received from an electronic pen in proximity to the electronic device. The location information is determined by the electronic pen and corresponds to a location of the electronic pen relative to the screen of the electronic device. The location information is determined using one or more of the transmitted signals received by the electronic pen. A display on the screen of the electronic device is controlled based at least in part on the received location information. A more efficient pen operating state is thereby provided that improves the user experience by more accurately and reliably determining the pen location in space.

20 Claims, 8 Drawing Sheets

(56) References Cited

U.S. PATENT DOCUMENTS

| | | |
|---|---|---|
| 2016/0306444 A1 | 10/2016 | Fleck |
| 2017/0038884 A1* | 2/2017 | Qiao .................... G06F 3/0442 |
| 2017/0205907 A1* | 7/2017 | Lim .................... G06F 3/03545 |
| 2017/0285771 A1 | 10/2017 | Jung et al. |
| 2018/0024654 A1 | 1/2018 | Koike et al. |
| 2018/0046272 A1 | 2/2018 | Hara et al. |
| 2018/0101273 A1 | 4/2018 | Varlamov et al. |
| 2018/0299976 A1* | 10/2018 | Chiewcharnpipat .... G06F 3/038 |

FOREIGN PATENT DOCUMENTS

| | | |
|---|---|---|
| WO | 2016171114 A1 | 10/2016 |
| WO | 2017023449 A1 | 2/2017 |

\* cited by examiner

DETECTION OF PEN LOCATION RELATIVE TO AN ELECTRONIC DEVICE

BACKGROUND

Electronic devices, such as smart boards, personal computers, laptops, mobile phones, and the like are increasingly equipped with screens or similar interfaces that enable a user to provide input by writing or drawing with a stylus, pen, or other pen-like device. For instance, wall-mounted or roller-stand-mounted interactive whiteboards with multi-touch and multi-pen capabilities have become increasing popular. Other electronic devices, such as tablet computers, which include touch screens as the primary user interface, have also become popular alternatives to conventional laptops with keyboards, mice, etc. The ability to draw on the screen offers flexibility regarding possible inputs.

However, while some of these devices are able to detect the proximity of an electronic pen to a screen of the devices (e.g., when the pen is in proximity, the device becomes aware of the device presence), the position of the device relative to the screen (e.g., right side or left side) if very difficult or impossible to determine. For example, some systems use a received signal magnitude to detect pen presence. But, this signal magnitude is not indicative of the pen position relative to the device. Specifically, because signal magnitude drops slowly, it is hard to determine a position of the pen, particularly if the pen is located on the side of the device. Moreover, the equi-capacitance to the device surfaces where the pen can reside around the device can lead to ambiguity with respect to the pen's actual position, and therefore a desired pen operation.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method comprises transmitting signals from a plurality of regions of an electronic device. The method further comprises receiving location information from an electronic pen in proximity to the electronic device. The location information is determined by the electronic pen and corresponds to a location of the electronic pen relative to a screen of the electronic device. The location information is determined using one or more of the transmitted signals received by the electronic pen. The method also comprises controlling a display on the screen of the electronic device based at least in part on the received location information.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Corresponding reference characters indicate corresponding parts throughout the drawings. In the figures, the systems are illustrated as schematic drawings. The drawings may not be to scale.

DETAILED DESCRIPTION

The computing devices and methods described herein transmit signals from different parts of a screen of an electronic device (e.g. electronic smartboard, such as the Microsoft Surface Hub®) to allow an electronic pen in proximity to the interface surface of the electronic device to detect or determine a position of the electronic pen relative to the electronic device. In some examples, an active pen is thereby able to know a position with respect to an inking device. As a result, an operational behavior of the pen can be change, such as changes in power modes (idle/active) and operation cycles (searching for other devices).

Touch sensors transmit beacons (uplink) signals that can be received by the pens to indicate to the pens the device presence and communication protocol. In some examples, having the beacons transmitted from different parts of the device, either at different times, or simultaneously using different signals, enables the receiving pen to determine a three-dimensional (3D) position of the pen relative to the device. Thus, by transmitting the uplink signal, for example, from only one part of the screen (and toggling over time to the other parts) enables the pen's 3D position relative to the device to be extracted and determined by the pen (e.g., the pen decodes signals received from different parts of the electronic device to determine position). Alternatively, by transmitting different signals (e.g., Tx, Tx', Tx'', Tx''' having different information) from different parts of the screen simultaneously, the same location information can be determined. As a result, a more efficient pen operating state is thereby provided that improves the user experience. In this manner, when a processor is programmed to perform the operations described herein, the processor is used in an unconventional way, and allows for the more efficient user input with the device.

Figure 1:
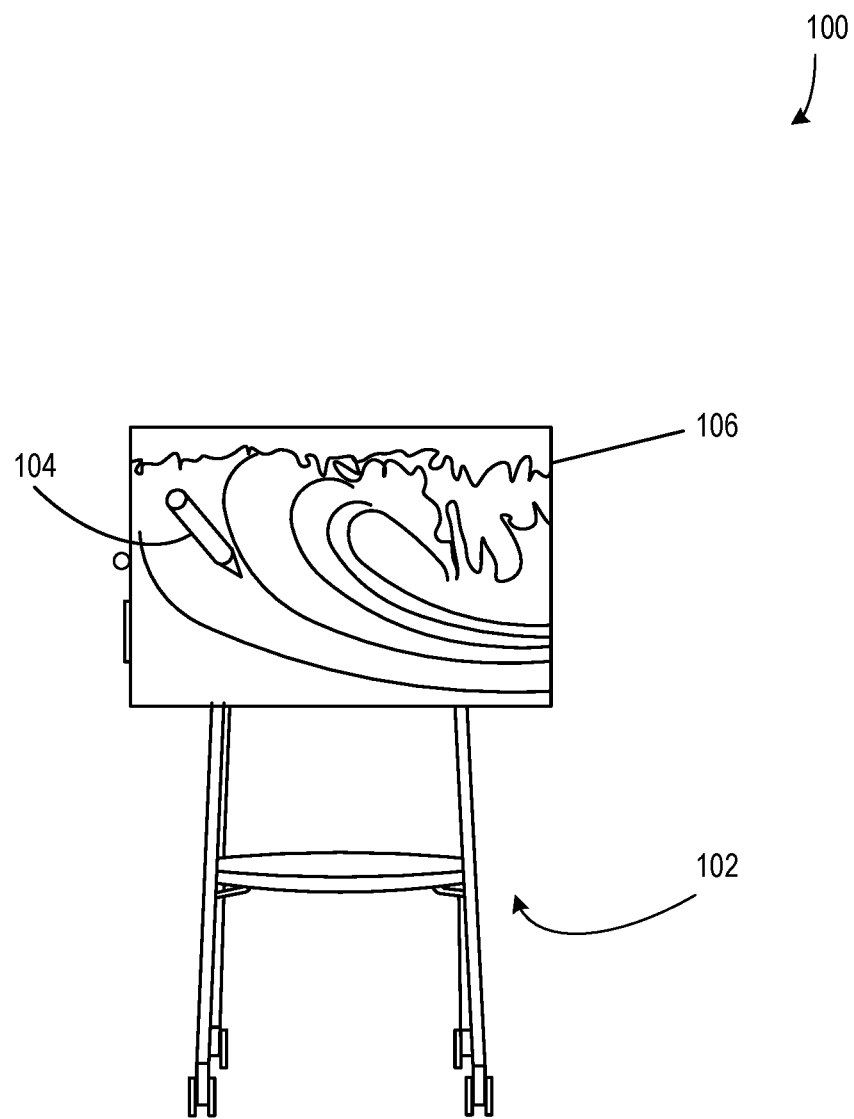
FIG. 1 illustrates a system including an electronic device and an associated pen according to an embodiment.

FIG. 1 illustrates a system 100 including an electronic device 102 and an associated pen 104 according in one example. The electronic device 102 and pen (or pen device) 104 are associated or linked such that the electronic device 102 and the pen 104 respond to each other. In one example, the pen 104 is uniquely associated with the electronic device 102 such that other pens and/or similar devices do not interact or interact differently with the electronic device 102.

The electronic device 102 includes a screen 106 defining a screen interface and is configured in one example as an electronic interactive smartboard. The screen interface receives input via touch sensor(s), pressure sensor(s), or the like. The input can be in the form of shapes, expressions, symbols, handwriting, etc. In one example, the pen 104 is used to touch, contact, depress, or otherwise interact with the screen 106 in order to provide input to the electronic device 102.

Figure 2:
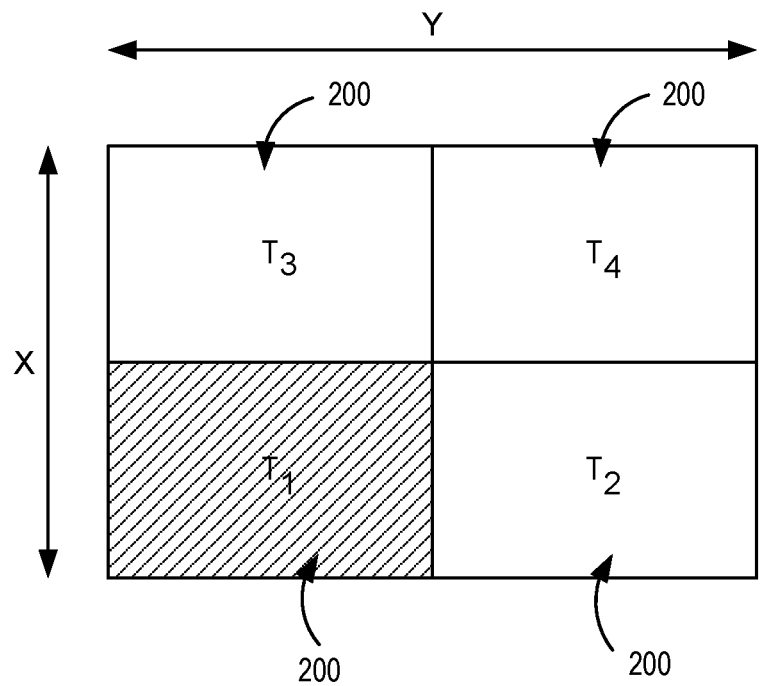
FIG. 2 illustrates a transmission configuration according to an embodiment.

Additionally, the electronic device 102 includes one or more transmitters (not shown in FIG. 1) configured to transmit uplink signals, which in some examples are electrodes of the screen interface. In one example as illustrated in FIG. 2, the uplink signal is transmitted from only one part of the screen (and toggled over time to the other parts), which enables the 3D position of the pen 104 to be determined relative or with respect to electronic device 102 (e.g., location in space in front of the screen 106) by the pen itself. In the illustrated example, the uplink signal is transmitted from four different regions 200, each at a different time, such as sequentially from $T_1$ then $T_2$ then $T_3$ then $T_4$. It should be appreciated that additional or fewer regions 200 can be provided and the order and timing of where the uplink signal is transmitted can be varied.

Figure 3:
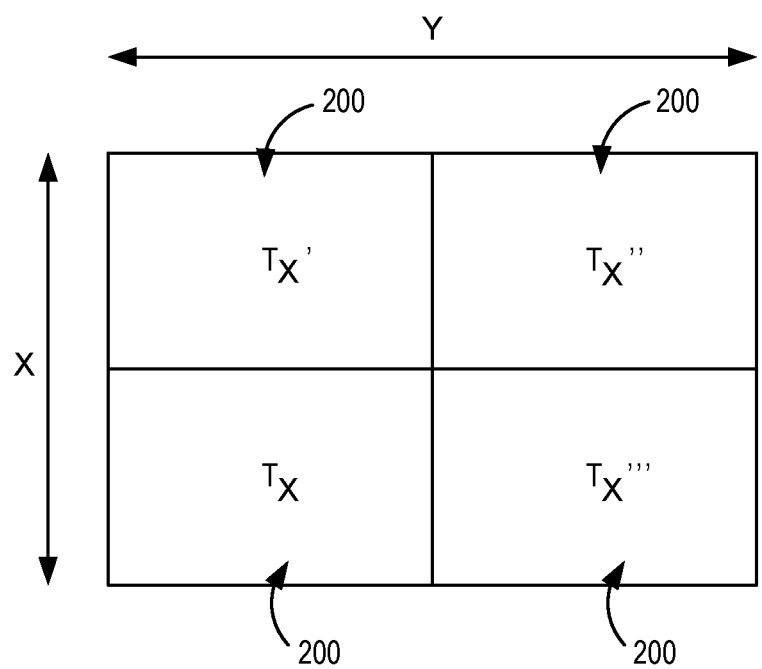
FIG. 3 illustrates another transmission configuration according to an embodiment.

In another example, as shown in FIG. 3, different uplink signals (illustrated as Tx, Tx', Tx'', Tx''') are transmitted from the different regions 200 of the screen 106 simultaneously. For example, each of the signals in some examples have a different frequency or amplitude. However, any types of signals having different information can be used to allow the pen 104 to determine position information relative to the electronic device 102. It should be noted that some or all of the transmission schemes illustrated in FIGS. 2 and 3 can be combined in some examples. Thus, spatial and/or temporal variations in the transmission of the signals can be implemented in various examples to allow the location of the pen 104 to be determined by the pen 104. That is, a pen 104, which is a small object with one spatial receiver, in some examples, is able to determine a location of the pen 104 relative to the electronic device 102.

The uplink signals in various examples are employed to detect the presence of the pen 104, as well as to allow the position of the pen 104 relative to the screen 106 of the electronic device 102 (e.g., in proximity to one of the regions 200) to be determined directly by the pen 104. Moreover, in some examples, one or more communication channels are established between the electronic device 102 and the pen 104, using communication techniques in the electronic pen technology, to enable uplink and downlink communication for bi-directional data exchange between the electronic device 102 and the pen 104. Thus, the uplink signal can be any type of signal transmitted from the electronic device 102 and detectable by the pen 104.

The pen 104 in one example is an active electronic pen (e.g., an active stylus) that includes electronic components that enable the pen 104 to interact with the electronic device 102, a user of the pen 104, other electronic devices, etc. For instance, in some examples, the pen 104 includes a wireless interface that enables the pen 104 to communicate wirelessly (via Wi-Fi, cellular, BLUETOOTH® short-range wireless communication protocol, other radio frequency communications, etc.) with the electronic device 102, even when the pen 104 is not in contact with the electronic device 102. Further, the pen 104 includes one or more of buttons, switches, and/or other input interfaces in some examples, which a user of the pen 104 uses to interact with the pen 104 and/or electronic components of the pen 104. Additionally, or alternatively, the pen 104 can include pressure sensors, motion sensors, accelerometers, gyroscopic sensors, or the like that enable the detection of motion, direction, angle, user input, gestures, etc. of the pen 104.

In operation, a proximity and relative position (e.g., XY position) of the pen 104 to the electronic device 102 is determined. The pen 104 is configured to receive one or more signals from the electronic device 102 to allow the pen 104 to determine a location of the pen 104 relative to the electronic device 102. In some examples, a detection of pen proximity to the electronic device 102 includes interpreting a signal strength of a wireless signal from the pen 104 as an indicator of pen proximity to thereby initiate signals being sent by the electronic device 102 to the pen 104 for use by the pen 104 to determine the location of the pen 104 (e.g., XY location of the pen 104 in front of the electronic device 102). For instance, the signal strength of the wireless signal is generally stronger when the pen 104 is close to a portion of the electronic device 102 that is transmitting the signal (e.g., uplink signal) and the signal strength of the wireless signal becomes weaker as the pen 104 moves away from the electronic device 102. Alternatively, or additionally, the pen 104 can also transmit, to the electronic device 102, information describing pen motion, pen direction, pen angle, etc. that can be used by the electronic device 102 to determine information relating to the pen 104.

In one example, when the electronic device 102 detects a proximity of the pen 104 by, at least in part, detecting a wireless signal from the pen 104, the electronic device 102 initiates a pen 104 location detection process, wherein signals are sent to the pen 104 as described herein to allow the pen 104 to determine a location thereof relative to the electronic device 102. In some examples, signal strength of the wireless signal received by the pen 104 can be used to determine pen location information.

The pen location detection process is initiated in some examples using a pen proximity threshold defined to include a signal strength threshold such that, when the signal strength threshold is crossed, the electronic device 102 determines that the pen 104 is within the pen proximity threshold and then begins transmission of the uplink signal(s) to allow the pend 104 to determine a position or location of the pen 104 relative to the screen 106 of the electronic device 102, such as where along or in front of the electronic device 102 the pen 104 is located. It should be appreciated that the initiation of the pen location determination process can be performed in many different ways, such as based on a user depression of a button on the pen 104 when in proximity to the electronic device 102, the electronic device 102 periodically transmitting signals therefrom, etc.

Figure 4:
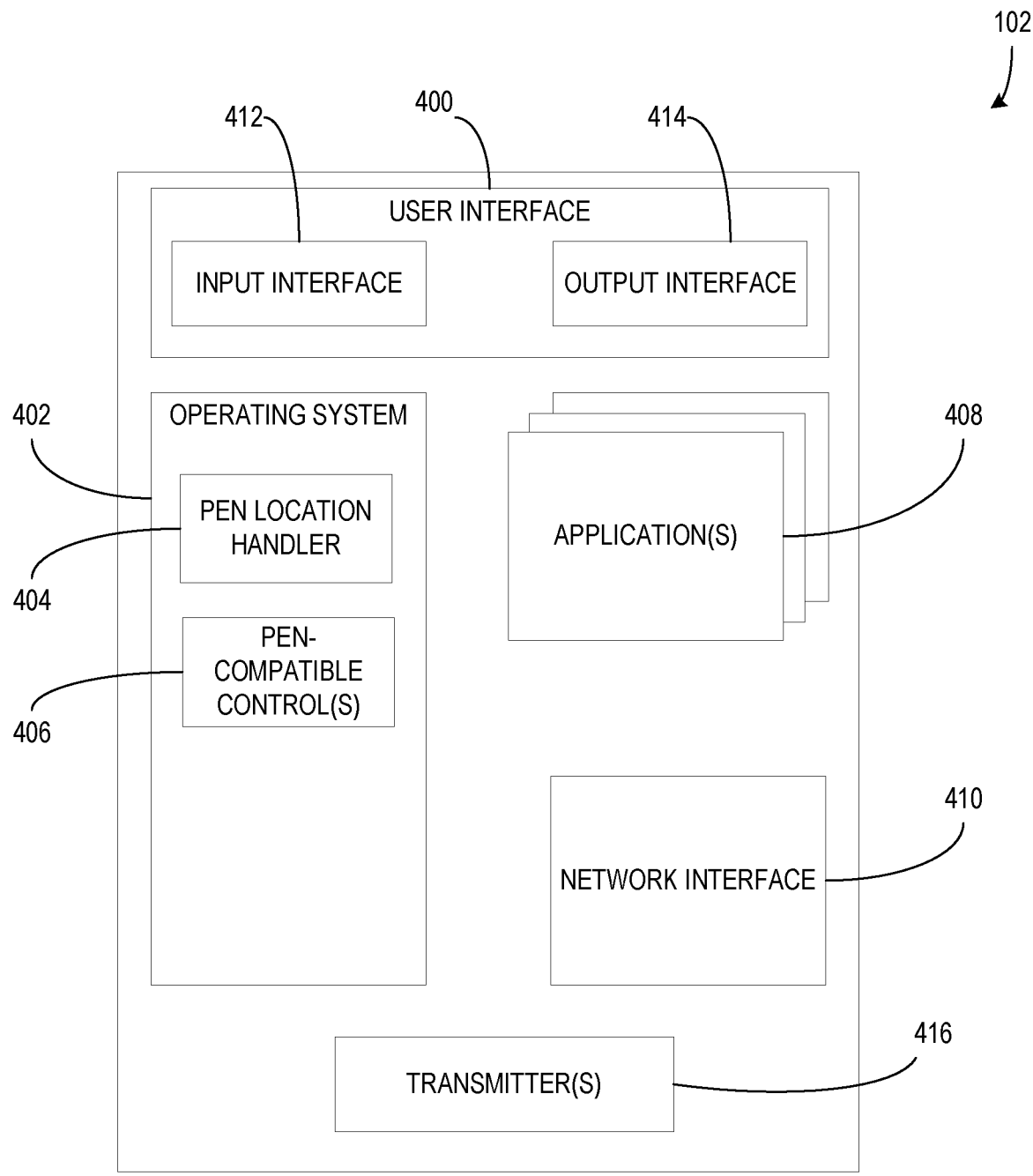
FIG. 4 illustrates a block diagram of an electronic device according to an embodiment.

FIG. 4 illustrates a block diagram of the electronic device 102 in one example. The electronic device 102 includes a user interface 400, an operating system 402 that includes a pen location handler 404 and pen-compatible control(s) 406, application(s) 408, and a network interface 410. The user interface 400 further includes an input interface 412 and an output interface 414.

In one example, the user interface 400 includes a touch screen, such as a smartboard touch screen. The input interface 412 is some examples includes a layer or portion of the touch screen that detects the location of contact, depression, or the like on the touch screen. Contact on the touch screen, whether by a user's finger, the pen 104, other types of stylus, or the like, is detected by the input interface 412 and interpreted as input to the user interface 400. The output interface 414 in some examples includes a layer or portion of the touch screen that displays, renders, or otherwise outputs information to a user of the electronic device 102. The output interface 414 can display colors, shapes, letters, or the like to communicate output information to a user of the electronic device.

Alternatively, or additionally, the input interface 412 receives input from a pen device (e.g., the pen 104) linked to the electronic device 102 as described herein. The pen 104 and electronic device 102 are in communication via the network interface 410 of the electronic device 102.

The input interface 412 can include other interfaces, such as keyboards, mice, switches, buttons, microphones, cameras, motion detection, etc. in some examples. These components of the input interface 412 further enable a user to input information into the electronic device 102. For instance, a camera associated with the input interface 412 can detect a user's gestures and interpret the gestures as a form of input information. In another example, the camera and input interface 412 are associated with an augmented reality device and/or a virtual reality device.

In some examples, the output interface 414 further includes speakers, vibration components, projector components, etc. These components of the output interface 414 further enable the electronic device 102 to communicate output information to a user. For instance, a vibration component of the output interface 414 vibrates to provide a notification to the user of the electronic device 102.

The operating system 402 in one example is a software component configured to perform core software operations of the electronic device 102 and to provide a platform upon which other software components (e.g., application(s) 408, etc.) are executed. It should be understood that the operating system 402 functions according to typical methods as understood by a person of ordinary skill in the art of computer science, computer engineering, or the like.

The pen location handler 404 includes software that interacts with the user interface 400, including controlling signals sent to the pen device (e.g., the pen 104, etc.) for use in determining the location of the pen 104 in space relative to the electronic device 102. The pen location handler 404 initially can listen for communications from the user interface 400 associated with pen proximity data during use of the electronic device 102. Based on, for example, a received initiation signal, the pen location handler 404 triggers a pen event that is sent to and/or received by other software components (e.g., application(s) 408, etc.) of the electronic device 102 in some examples. As described in more detail herein, the pen location handler 404 controls generation of uplink signals by one or more transmitter(s) 416 to allow the pen 104 to determine the location of the pen 104 relative to the screen 106 of the electronic device 102. In some examples, transmitters 416 are electrodes in the electronic device that are selectively driven (e.g., radio-frequency (RF) driven) in defined areas corresponding to the regions 200 that allow the pen 104 to determine a relative location to the electronic device 102. Thus, in some examples, a subset of electrodes are driven that are located in each of the regions 200 to provide signals to the pen 104 for use in determining the location information.

The pen-compatible control(s) 406 are software components associated with the operating system 402 that cause the electronic device 102 to react to and/or interact with the pen 104. In one example, the pen-compatible control(s) 406 cause the user interface 400 to provide a user of the electronic device 102 with a writing region, information and/or guidance regarding context of the writing region, or the like. For instance, the pen-compatible control(s) 406 cause the user interface 400 to display a box on the screen containing a writing region and a prompt in or near the box describing the box as an address field, name field, signature field, search term field, or the like. Further the pen-compatible control(s) 406 can include check boxes and/or list items that expand to provide additional details based on the proximity of the pen or map controls that zoom in to a geographic area and provide a virtual writing area associated with the geographic area that the user can use to add notes about the geographic area. The location on the screen 106 of the displayed information changes in some examples based on the location of the pen 104 as determined by the pen 104.

The application(s) 408 are software components that can be installed on the electronic device 102. In one example, the application(s) 408 use the operating system 402 as a platform for executing instructions and/or providing functionality to a user of the electronic device 102. For instance, the application(s) 408 can be a word processing application, an email application, a web browser, a messaging application, a game, or the like. It should be understood that the application(s) 408 can be of any application type known to a person of ordinary skill in the art without departing from the scope of the description herein.

The application(s) 408 in some examples include a pen event handler component that is configured to receive, detect, and/or react to pen events that are triggered by the operating system. The pen event handler of the application(s) 408 cause the activation of pen-compatible controls or other operations to be performed.

The application(s) 408 in some examples lack application-specific controls and/or functionality to accept and process pen input, and instead access the one or more pen-compatible controls 406 from the operating system 402 for use within the application 406 when pen input is detected. In one example, a messaging application is not configured to handle pen input and, when a pen event is received by the messaging application, the messaging application accesses or requests to use a pen-compatible control provided by the operating system 402 to display a writing region and convert pen input into text which the messaging application then uses to communicate to a user's contact in a message. The request can occur via an application programming interface (API) call to the operating system.

Alternatively, the application(s) 408 are configured to include pen-compatible controls and handle incoming pen events without requesting the pen-compatible control(s) 406 from the operating system 402. For instance, a map application can include the pen-compatible control(s) 406 that automatically transform pen input on a map region of the user interface 400 into a pinpoint on the map. Further, a user can be prompted as to whether the pinpoint is a new destination, a new location of interest, or the like.

The network interface 410 provides an interface by which the electronic device 102 communicates with other electronic devices, computing devices, access points, or the like. The network interface 410 also provides access to one or more channels of network communication, including wired network connections, wireless network connections, etc. In some examples, components described as being part of the electronic device 102 can instead be located outside of the electronic device 102 and accessed by the electronic device 102 via the network interface 410.

In various examples, the electronic device 102 comprises a user interface, at least one processor, and at least one memory comprising computer program code. The computer program code is configured to, with the at least one processor, perform the operations illustrated in the flowcharts.

In operation, in one example, the input interface 412 is configured to recognize an input received via touchscreen functionality of the electronic device 102, such as a digitizer panel. The input interface 412 operates to detect a presence of the pen 104 to thereby initiate transmission of signals to allow the location of the pen 102 to be determined by the pen (e.g., of the pen 102 within a threshold distance/proximity to the electronic device 102), recognize and resolve input provide via the pen 102, and so on. The input can take a variety of different forms, such as to recognize movement of the pen 104 across the screen 106 of the electronic device 102, pressing and tapping on the digitizer panel, drawing of a line, and so on. As a result, a user is able to perform a variety of different writing operations, such as to draw a line to mimic a pencil, pen, brush, and so on, as well as to perform erase operations, such as to mimic a rubber eraser.

Thus, in accordance with techniques described herein, the pen location handler 404 is configured to recognize the presence of the pen 104 and control transmission of signals to allow the pen to resolve a position of the pen 102 in space relative to the electronic device 102. In implementations, pen recognition and position are based on uplink signals transmitted to and received by the pen 104. For example, an analysis of uplink signals received from a region 200 (shown in FIG. 2) by the pen 104 can be used to determine the location of the pen 102, which allows mapping to different contexts including different interaction modes, stylus positions, hand positions, user positions, and scenarios, or operational behavior, among others. Accordingly, the pen 104 can recognize different uplink signals (such a signals having different magnitudes or frequencies) from the transmitters 416 and match the uplink signal (e.g., signal decoding) to corresponding locations of the electronic device 102 from where signals were transmitted, or other contexts.

Figure 5:
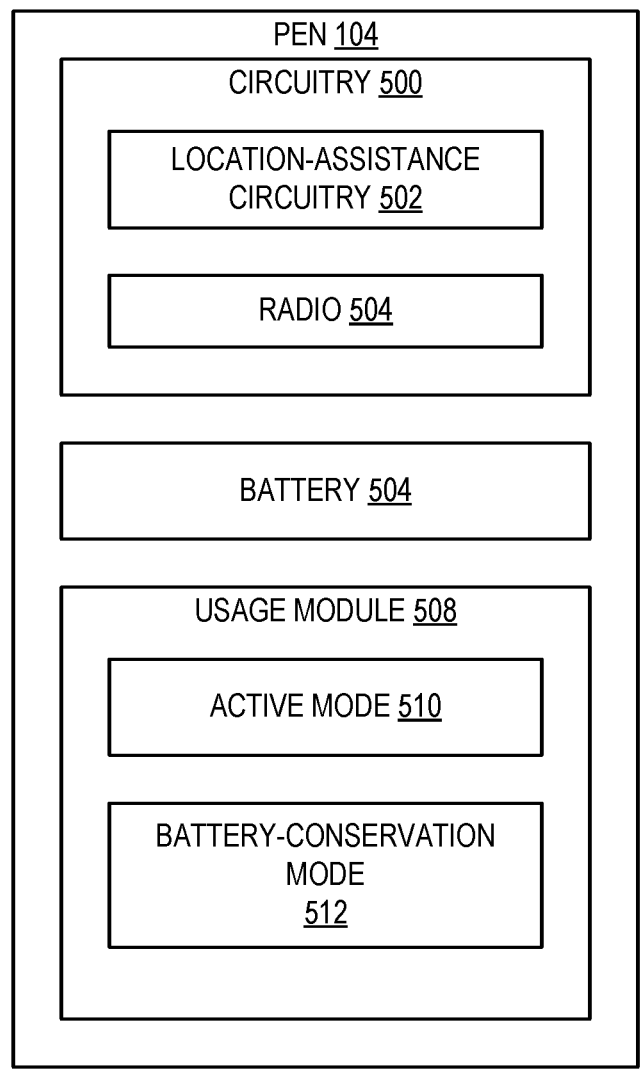
FIG. 5 illustrates a pen according to an embodiment.

As further illustrated in FIG. 5, the pen 104 can include different types of circuitry 500. For example, the circuitry 500 in the illustrated example includes location-assistance circuitry 502 to aid in determining the location (e.g., an XY location) of the pen 104 in relation to the screen 106, for example, using signals transmitted by the electronic device 102 (e.g., the electronic device 102 transmits signals from different areas in a distinguishable way, such as time sharing of different signals). In this example, the circuitry 500 also includes a radio 504 to support communication with the electronic device 102, such as to communicate data used once the XY location is determined by the pen 104. To power the circuitry 500, the pen 104 includes a battery 506.

The pen 104 also includes a usage module 508. The usage module 508 is representative of functionality of the pen 104 to enter different usage modes. For example, the usage module 508 in the illustrated example supports an active mode 510 in which the circuitry 500 of the pen 104 is made active and therefore permitted to consume power from the battery 506. Thus, the circuitry 500 is available for use, such as to assist in determining the XY location of the pen 104 to the electronic device 102 and for receiving and processing data conveyed from the electronic device 102 to the pen 104.

The usage module 508 also supports a battery-conservation mode 512 to conserve power of the battery 506, such as to make some of all of the circuitry 500, such as the location-assistance circuitry 502, the radio 504, and so on inactive to minimize consumption of the battery 506. In this way, the usage module 508 enters a low power state and conserves resources of the battery 506, yet enables functionality of the circuitry 500 at appropriate times. It should be appreciated that many other operational behaviors or characteristics can be similarly controlled, such as the manner in which the pen 104 interacts with the electronic device 102.

Figure 6:
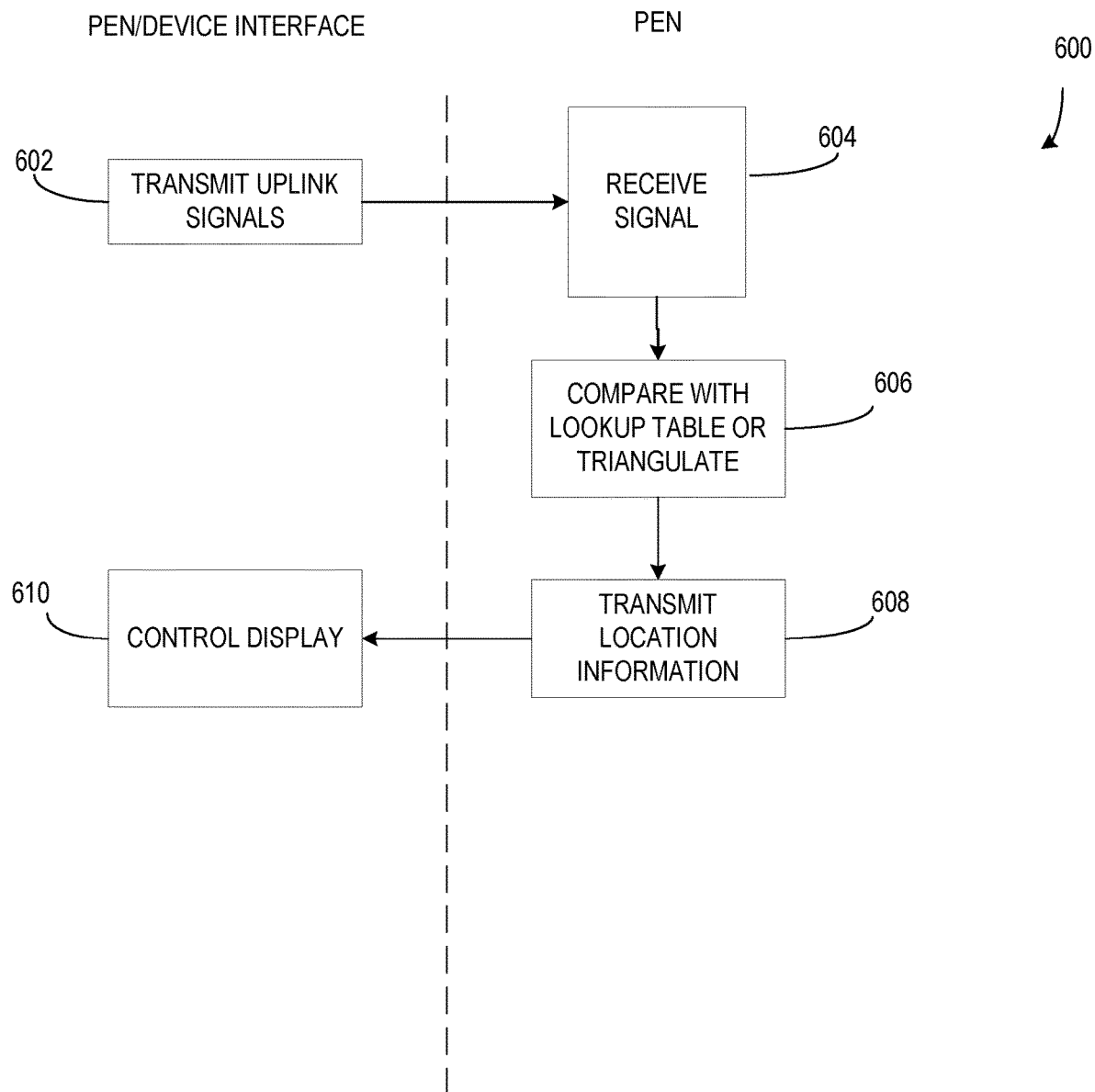
FIG. 6 illustrates a diagram of interactions between a pen/device interface and a pen according to an embodiment.

FIG. 6 illustrates a diagram of interactions between a pen/device interface (e.g., the user interface 412, etc.) and the pen 104 according to an example. The pen/device interface transmits uplink signals to the pen 104 at 602. At 604, the pen receives uplink signals, which can be one or more from different regions 200 of the electronic device 102, and determines from what region 200 the signal was transmitted. It should be noted that in some examples, prior to initiating transmission of the uplink signals, the pen/device interface receives pen proximity data as described herein and determines whether a proximity threshold is crossed or passed based on the pen proximity data, and thereby indicating that a pen location determination process should begin. Additionally, it should be noted that the pen 104, in some examples, only receives uplink signals from the transmitters 416 of the electronic device 102 when the pen 104 is in proximity to the electronic device 102. For example, in some examples, the power of the transmitters 416 are set to allow reception by the pen 104 only when the pen 104 is located within the physical space in proximity to where the transmitters 416 are located.

The pen 104 then compares information transmitted with the uplink signals or as determined from the transmitted uplink signals (e.g., unique frequency, magnitude or encoding) with data stored in a lookup table at 606 (e.g., corresponding location data). For example, the lookup table allows the pen 104 to determine from which region 200 and/or at what frequency the uplink signals were transmitted. For example, the lookup table allows the pen 104 to determine a transmitting region 200 of the uplink signals. In some examples as described in more detail herein, triangulation is performed at 606 determine the transmitting region 200 of the uplink signals, such as based on the magnitude and encoding information within the signals.

It should also be noted that as part of the communication exchange, the pen 104 is also configured to determine the particular electronic device 102 with which the pen 104 is communicating and adjust the operational behavior of the pen 104. Moreover, a specific lookup table can be associated with different electronic devices 102 to allow for decoding of different uplink signals from the different electronic devices 102.

In other examples, the location-assistance circuitry 502 of the pen 104 decouples the received uplink signals from the different regions 200 and performs a numerical analysis based on the signals, for example when the uplink signals are transmitted from regions 200 as illustrated in FIG. 2 or FIG. 3. In one example, the numerical analysis translates a plurality of measurements from received uplink signals to position the pen 104 in space relative to the transmitting device, namely the transmitters 416. The translation in some examples is configured based on machine learning or neural networks (or other deep learning engine) that trains the location-assistance circuitry 502 in controlled training sessions (e.g., perform measurements at different locations that are input to a neural network). In some examples, triangulation processes are trained.

The pen 104 in some examples can then transmit determined location information to the electronic device 102 at 608. For example, based on the information determined from the lookup table or other analysis performed, the pen 104 transmits to the electronic device 102 the relative location of the pen 104, such as the region 200 in proximity to which the pen 104 is located. Thus, the electronic device 102 receives information from the pen 104, such as regarding the location of the pen 104 (e.g., located in an upper left portion of the screen 106, a lower left right portion of the screen 106, etc.).

At 610, the pen/device interface controls the display of the screen 106. For example, the pen/device interface controls the content of data, the active data area, etc. of the screen 106 based on the region 200 where the pen 104 is located (e.g., the pen 106 is in front of a particular region 200). In some examples, the screen 106 includes a plurality of pixels (electrodes) that are driven by the pen/device interface, which can be selectively controlled based on the determined location of the pen 104.

Figure 7:
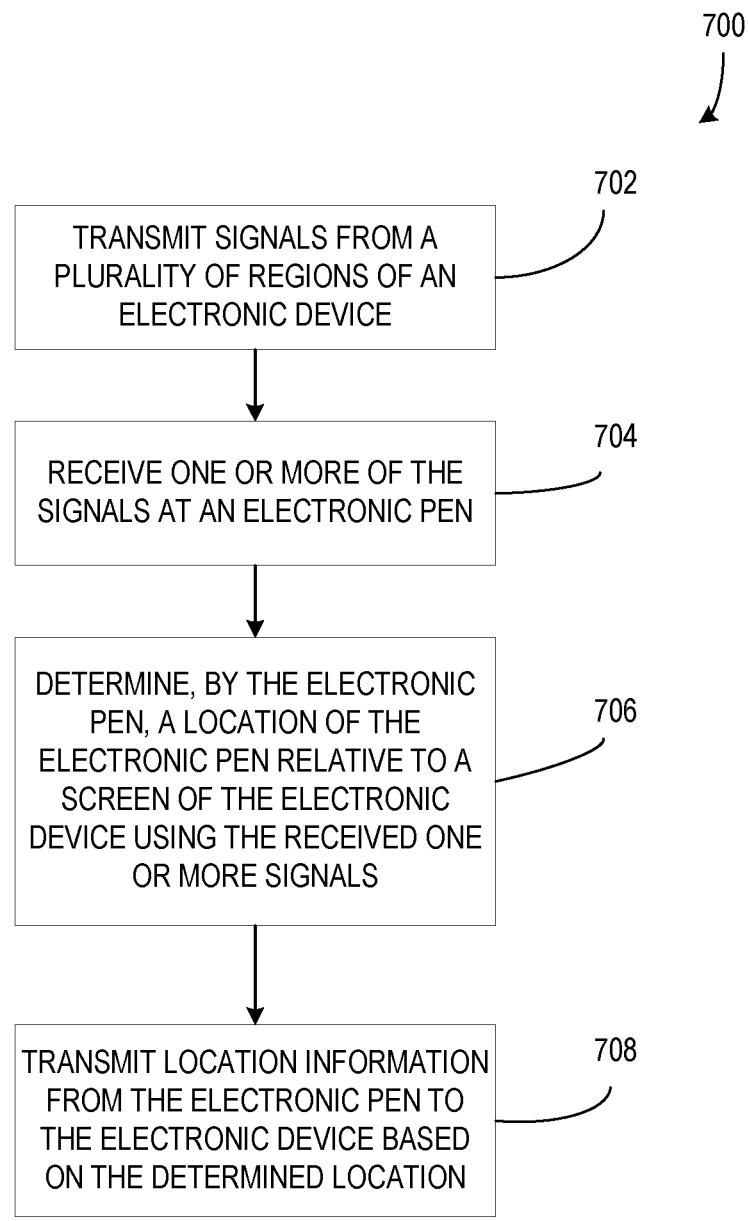
FIG. 7 illustrates a flow chart of a method for determining the location of an electronic pen according to an embodiment.

FIG. 7 illustrates a flow chart of a method 700 for determining a location of an electronic pen. The method 700 allows for more accurate and reliable locating of the electronic pen relative to a screen. For example, with methods that use a change in magnitude of a received signal from all portions of the electronic device, the XY location of the pen relative to the screen of the electronic device cannot accurately and reliably determined (e.g., location relative to an electronic interactive whiteboard). It should be noted that the exemplary flow chart illustrates operations of a computing device of the electronic device to determine the location of the electronic pen relative to the screen of the electronic device. The operations illustrated in the flow charts described herein can be performed in a different order than is shown, can include additional or fewer steps and can be modified as desired or needed. Additionally, one or more operations can be performed simultaneously, concurrently or sequentially.

More particularly, the method 700 includes transmitting signals from a plurality of regions of an electronic device at 702. For example, one or more uplink signals capable of being received by an electronic pen are transmitted from the electronic device. As described herein, uplink signals are transmitted from different regions of the electronic device. For example, a time division transmission scheme is used in some examples wherein the uplink signals are transmitted from the different regions at different times. For example, over a defined time period, an uplink signal is transmitted from each region, one at a time. The transmission from each region can be a single uplink signal or multiple uplink signals transmitted over a period of time. In some examples, the uplink signals are sequentially transmitted from within each of the regions, which can be repeated multiple times. It should be noted that when using time division transmission, the pen receiving the signals does not have to decouple the transmission.

As another example, the different regions transmit signals having different information at the same time. For example, signals from the different regions can be transmitted at different frequencies or magnitudes simultaneously or concurrently. Different types of signal modulation are used in different examples, such as frequency modulation or amplitude modulation. In other examples, the signals are encoded with data to allow for correlating the signal with a particular region. It should be noted that when transmitting signals with different information, the pen receiving the signal can perform triangulation calculations, such as used in the object locating technology after receiving the signals to determine pen location. It should also be noted that in one example, when the signals are transmitted simultaneously, the signals are orthogonal in some aspects so as to not interfere. The signals can then be decoded by the pen.

The method 700 includes receiving one or more of the signals at the electronic pen 704. For example, the transmitted uplink signals are received by the pen when the pen is in proximity to the electronic device. In some examples, as described herein, the electronic device only begins transmission after a proximity detection is satisfied, wherein the pen is determined to be within a threshold distance of a surface of the electronic device (e.g., hovering in front of or over the screen of an interactive whiteboard).

The method 700 includes determining, by the electronic pen, a location of the electronic pen relative to a screen of the electronic device using the received one or more signals at 706. For example, the pen can use a lookup table (separate lookups table can be provided for different electronic devices) to identify from which transmitter(s) the signal(s) originated when the signal(s) are transmitted using time division. The signals do not have to be decoupled because the signals are transmitted from each of the regions at different times. If signals are transmitted simultaneously from the multiple regions, the pen in some examples can decode the signals using frequency demodulation and determine the origin of the transmission using triangulation calculations. Thus, from the transmissions from the multiple regions, the pen is able to determine, for example, an XY location relative to a screen of the electronic device.

The method 700 also includes in some examples transmitting determined location information from the electronic pen to the electronic device based on the determined location at 708. For example, once the pen determines the region that transmitted the uplink signal(s) and determines the location of the pen in space in front of the electronic device, the pen transmits location information to the electronic device indicating where the pen is located.

Thus, the pen is able to determine a location thereof in space relative to the electronic device. When multiple electronic devices (e.g., electronic whiteboards) are placed side by side, the method facilitates an easier and more accurate determination of the location of the pen (as determined by the pen), particularly when positioned along an end of one of the electronic devices. Moreover, in some examples, the location information is used to control a display on the screen of the electronic device based at least in part on the determined location information.

Figure 8:
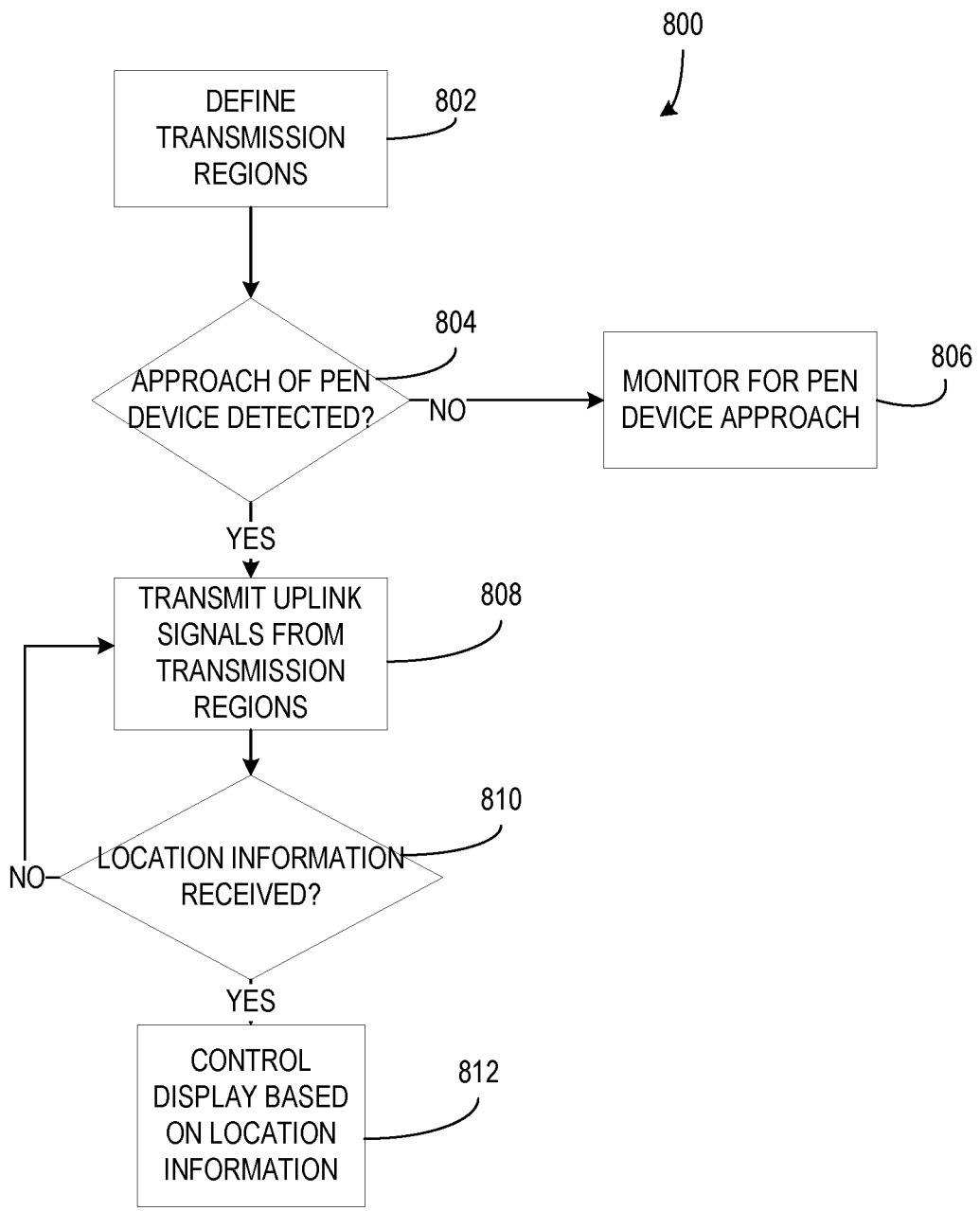
FIG. 8 illustrates another flow chart of a method for determining the location of an electronic pen according to an embodiment.

FIG. 8 illustrates a flow chart of a method 800 for determining a location of an electronic pen. The method includes defining transmission regions of an electronic device at 802. The electronic device is any device that can interact with the electronic pen. In one example, the electronic device is an electronic whiteboard having electrodes driven by RF signals to transmit across the screen of the electronic whiteboard. The transmission regions in some examples are defined by a subset of the electrodes, such that the electrodes in each region are controlled as described herein to determine location information for the electronic pen. For example, the electrodes in each of the regions can be selectively driven or driven together, but at different magnitudes or frequencies by one or more RF drivers.

The method 800 includes, in some examples, detecting whether a pen device, such as the electronic pen, approaches the electronic device at 804. For example, a proximity detection can be performed as described herein to detect when the electronic pen is within a transmission range of the electronic device. Detecting the approach of the electronic pen is based on pen proximity data as described herein. For example, detecting the approach can include detecting a wireless signal from the electronic device. If pen approach is not detected, continued monitoring for pen approach is performed at 806. In some examples, a detection process is not performed until the electronic pen is within a threshold distance from the screen of the electronic device.

If pen approach is detected at 804, uplink signals are transmitted from the defined transmission regions at 808. For example, the electrodes in one or more of the transmission regions are driven by one or more RF driving circuits in some examples. The RF driving circuits can be any type of electrode driving circuit for displays, such as for touchscreen or smartboard types of displays. As described herein, different transmission methods or schemes can be used, such as, time division transmissions, frequency modulated transmission, amplitude modulated transmissions, etc.

A determination is then made at 810 whether location information is received from the electronic pen. For example, as described herein, the electronic pen transmits determined location information based on calculations or an analysis of the received uplink signals performed by the pen. The location information indicates to the electronic device where the electronic pen is located in space. If location information is not received, then uplink signals continue to be transmitted from the transmission regions at 808. For example, if location information is not received after transmission from one transmission region, transmission from another transmission region is performed. Additionally, if location information is not received after transmission from all the transmission regions, the process is repeated, which occurs for a predetermined number of cycles in some examples. It should be noted that a confirmation signal or proximity can be sent from the pen to the electronic device in some examples when the electronic devices approaches or is in proximity to the electronic device.

If location information is received by the electronic device, the display of the electronic device is controlled based on the location information at 812. For example, a portion of the screen of the electronic device is made active or caused to display certain information. In some examples, the location information allows side by side electronic devices to determine which device(s) should be active when the electronic pen is at an edge between two electronic devices (e.g., at an edge between two electronic whiteboards).

Thus, in some examples, the methods 700 and 800 allow an electronic pen to determine an electronic pen location in space relative to an electronic device.

Exemplary Operating Environment

Figure 9:
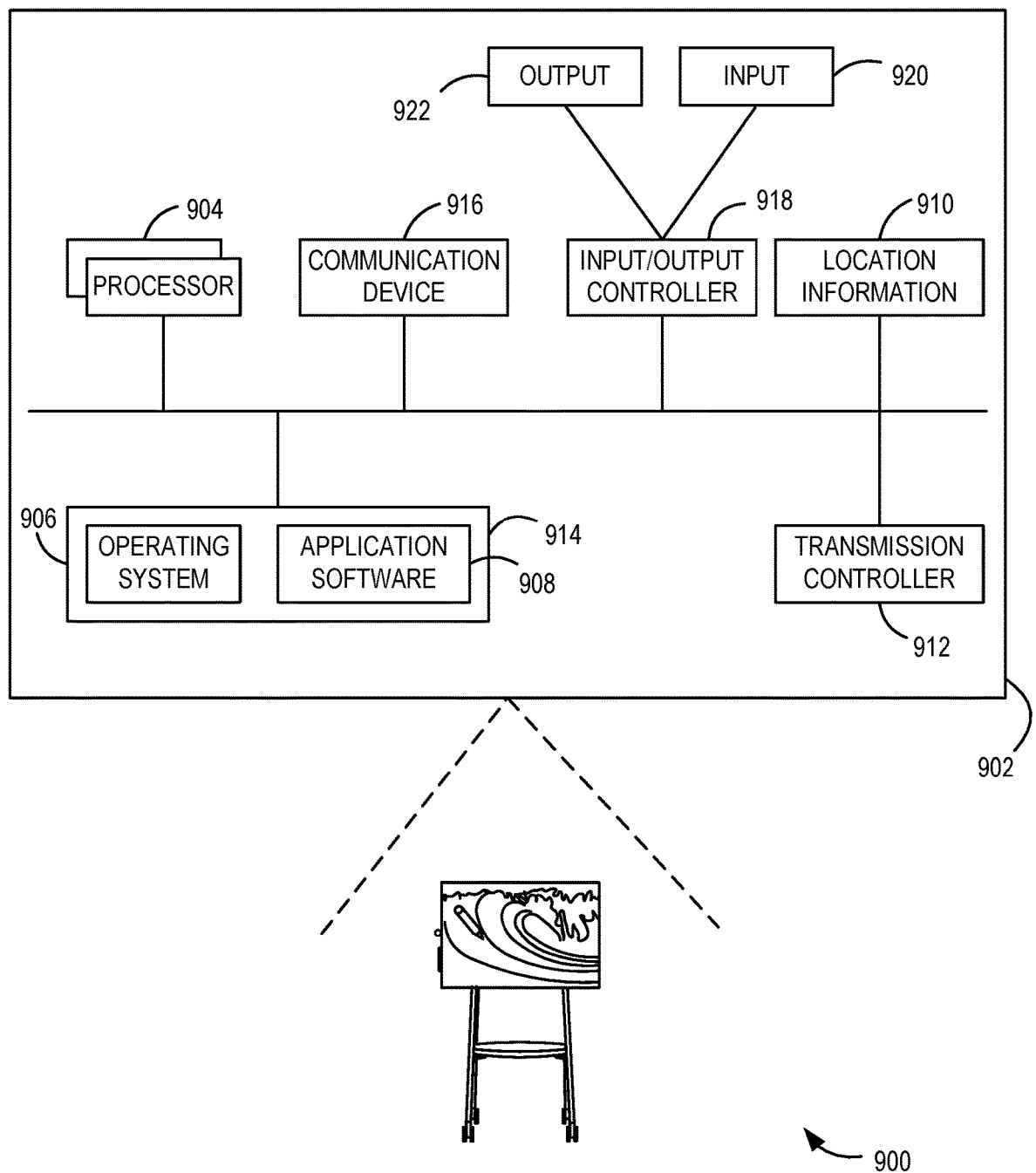
FIG. 9 illustrates a computing apparatus according to an embodiment as a functional block diagram.

The present disclosure is operable with a computing apparatus 902 according to an embodiment as a functional block diagram 900 in FIG. 9. In one example, components of the computing apparatus 902 can be implemented as a part of an electronic device according to one or more embodiments described in this specification. The computing apparatus 902 comprises one or more processors 904 which can be microprocessors, controllers or any other suitable type of processors for processing computer executable instructions to control the operation of the electronic device. Platform software comprising an operating system 906 or any other suitable platform software can be provided on the apparatus 902 to enable application software 908 to be executed on the device. According to an embodiment, location information 910 determined by an electronic pen based on signals transmitted from a transmission controller 912 (e.g., signal transmissions from different regions) can be accomplished by software.

Computer executable instructions can be provided using any computer-readable media that are accessible by the computing apparatus 902. Computer-readable media can include, for example, computer storage media such as a memory 914 and communications media. Computer storage media, such as the memory 914, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media can embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 914) is shown within the computing apparatus 902, it will be appreciated by a person skilled in the art, that the storage can be distributed or located remotely and accessed via a network or other communication link (e.g. using a communication device 916).

The computing apparatus 902 can comprise an input/output controller 918 configured to output information to one or more input devices 920 and output devices 922, for example a display or a speaker, which can be separate from or integral to the electronic device. The input/output controller 918 can also be configured to receive and process an input from the one or more input devices 920, for example, a keyboard, a microphone or a touchpad. In one embodiment, the output device 922 can also act as the input device 920. An example of such a device can be a touch sensitive display. The input/output controller 918 can also output data to devices other than the output device 922, e.g. a locally connected printing device. In some embodiments, a user can provide input to the input device(s) 920 and/or receive output from the output device(s) 922.

In some examples, the computing apparatus 902 detects voice input, user gestures or other user actions and provides a natural user interface (NUI). This user input can be used to author electronic ink, view content, select ink controls, play videos with electronic ink overlays and for other purposes. The input/output controller 918 outputs data to devices other than a display device in some examples, e.g. a locally connected printing device.

NUI technology enables a user to interact with the computing apparatus 902 in a natural manner, free from artificial constraints imposed by input devices such as mice, keyboards, remote controls and the like. Examples of NUI technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, infrared camera systems, red green blue (rgb) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electro encephalogram (EEG) and related methods).

The functionality described herein can be performed, at least in part, by one or more hardware logic components. According to an embodiment, the computing apparatus 902 is configured by the program code when executed by the processor(s) 904 to execute the embodiments of the operations and functionality described. Alternatively, or in addition, the functionality described herein can be performed, at least in part, by one or more hardware logic components. For example, and without limitation, illustrative types of hardware logic components that can be used include FPGAs, ASICs, ASSPs, SOCs, CPLDs, and GPUs.

At least a portion of the functionality of the various elements in the figures can be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that can be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices can accept input from the user in any way, including from input devices such as a keyboard or pointing device, via gesture input, proximity input (such as by hovering), and/or via voice input.

Examples of the disclosure are described in the general context of computer-executable instructions, such as program modules, executed by one or more computers or other devices in software, firmware, hardware, or a combination thereof. The computer-executable instructions can be organized into one or more computer-executable components or modules. Generally, program modules include, but are not limited to, routines, programs, objects, components, and data structures that perform particular tasks or implement particular abstract data types. Aspects of the disclosure can be implemented with any number and organization of such components or modules. For example, aspects of the disclosure are not limited to the specific computer-executable instructions or the specific components or modules illustrated in the figures and described herein. Other examples of the disclosure can include different computer-executable instructions or components having more or less functionality than illustrated and described herein.

In examples involving a general-purpose computer, aspects of the disclosure transform the general-purpose computer into a special-purpose computing device when configured to execute the instructions described herein.

Other examples include:
An electronic device comprising:
a screen;
at least one processor; and
at least one memory comprising computer program code, the at least one memory and the computer program code configured to, with the at least one processor, cause the electronic device to at least:
transmit signals from a plurality of regions of an electronic device;
receive location information from an electronic pen in proximity to the electronic device, the location information determined by the electronic pen and corresponding to a location of the electronic pen relative to the screen of the electronic device using one or more of the transmitted signals received by the electronic pen; and
control a display on the screen of the electronic device based at least in part on the received location information.

Other examples include:
A method to determine a location of an electronic pen, the method comprising:
transmitting signals from a plurality of regions of an electronic device;
receiving location information from an electronic pen in proximity to the electronic device, the location information determined by the electronic pen and corresponding to a location of the electronic pen relative to a screen of the electronic device using one or more of the transmitted signals received by the electronic pen; and
controlling a display on the screen of the electronic device based at least in part on the received location information.

Other examples include:
One or more computer storage media having computer-executable instructions that, upon execution by a processor, cause the processor to at least:
transmit signals from a plurality of regions of an electronic device;
receive location information from an electronic pen in proximity to the electronic device, the location information determined by the electronic pen and corresponding to a location of the electronic pen relative to a screen of the electronic device using one or more of the transmitted signals received by the electronic pen; and
control a display on the screen of the electronic device based at least in part on the received location information.

Alternatively, or in addition to the other examples described herein, examples include any combination of the following:
wherein transmitting signals comprises a time division transmission wherein signals are transmitted from each of region of the plurality of regions at different times.
wherein transmitting signals comprises transmitting the signals from the plurality or regions simultaneously, the signals transmitted from each region having one of a different frequency or amplitude.
wherein the electronic device comprises a screen having a plurality of electrodes and further comprising driving subsets of electrodes of the plurality of electrodes corresponding to each region of the plurality of regions.
wherein transmitting signals comprises transmitting uplink signals in response to detection of the electronic pen within a proximity threshold of the screen of the electronic device.
using a lookup table to determine the location of the electronic pen relative to the screen of the electronic device based at least on the one or more signals.

decoding the received one or more signals and performing triangulation based on the received one or more signals to determine the location of the electronic pen relative to the screen of the electronic device.

Any range or device value given herein can be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above can relate to one embodiment or can relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for training a neural network. The illustrated one or more processors 904 together with the computer program code stored in memory 914 constitute exemplary processing means for determining the location of an electronic pen.

The terms 'computer', 'computing apparatus', 'mobile device' and the like are used herein to refer to any device with processing capability such that it can execute instructions. Those skilled in the art will realize that such processing capabilities are incorporated into many different devices and therefore the terms 'computer' and 'computing apparatus' each can include PCs, servers, laptop computers, mobile telephones (including smart phones), tablet computers, media players, games consoles, personal digital assistants, and many other devices.

The term "comprising" is used in this specification to mean including the feature(s) or act(s) followed thereafter, without excluding the presence of one or more additional features or acts.

In some examples, the operations illustrated in the figures can be implemented as software instructions encoded on a computer readable medium, in hardware programmed or designed to perform the operations, or both. For example, aspects of the disclosure can be implemented as a system on a chip or other circuitry including a plurality of interconnected, electrically conductive elements.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there can be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

The invention claimed is:

1. An electronic device comprising:
   a screen;
   at least one processor; and
   at least one memory comprising computer program code, the at least one memory and the computer program code configured to, with the at least one processor, cause the electronic device to at least:
   transmit signals from a plurality of regions of an electronic device;
   receive location information from an electronic pen in proximity to the electronic device, the location information determined by the electronic pen using one or more of the transmitted signals received by the electronic pen to determine a transmitting region of the electronic device corresponding to a location of the electronic pen relative to the screen of the electronic device, the electronic pen configured to recognize different signals transmitted from the electronic device and decode the different signals to determine the location information, wherein the location information comprises a three-dimensional (3D) location of the electronic pen relative to the electronic device; and
   control a display on the screen of the electronic device based at least in part on the received location information.

2. The electronic device of claim 1, wherein transmitting signals comprises a time division transmission wherein signals are transmitted from each region of the plurality of regions at different times.

3. The electronic device of claim 1, wherein transmitting signals comprises transmitting the signals from the plurality of regions simultaneously, the signals transmitted from each region having one of a different frequency or amplitude.

4. The electronic device of claim 1, wherein the screen comprises a plurality of electrodes and the computer program code is further configured to, with the at least one processor, cause the electronic device to at least drive subsets of electrodes of the plurality of electrodes corresponding to each region of the plurality of regions, the location information comprising the 3D location of the electronic pen in relation to the screen determined by the electronic pen by processing the one or more of the transmitted signals using circuitry in the electronic pen.

5. The electronic device of claim 1, wherein transmitting signals comprises transmitting uplink signals in response to detection of the electronic pen within a proximity threshold of the screen of the electronic device, the uplink signals having one of a unique frequency, a unique magnitude or a unique encoding for each region of the plurality of regions to identify the transmitting region.

6. The electronic device of claim 1, wherein the computer program code is further configured to, with the at least one processor, cause the electronic pen to at least use a lookup table to determine the location of the electronic pen relative to the screen of the electronic device based at least on the one or more signals to determine the 3D position of the electronic pen relative to the electronic device, the electronic pen configured to recognize different signals transmitted from different electronic devices, and different lookup tables are associated with different electronic devices to decode signals from the different electronic devices.

7. The electronic device of claim 1, wherein the computer program code is further configured to, with the at least one processor, cause the electronic pen to at least decode the received one or more signals and perform triangulation based on the received one or more signals to determine the location of the electronic pen relative to the screen of the electronic device.

8. A method to determine a location of an electronic pen, the method comprising:
    transmitting signals from a plurality of regions of an electronic device;
    receiving location information from an electronic pen in proximity to the electronic device, the location information determined by the electronic pen using one or more of the transmitted signals received by the electronic pen to determine a transmitting region of the electronic device corresponding to a location of the electronic pen relative to a screen of the electronic device, the electronic pen configured to recognize different signals transmitted from the electronic device and decode the different signals to determine the location information, wherein the location information comprises a three-dimensional (3D) location of the electronic pen relative to the electronic device; and
    controlling a display on the screen of the electronic device based at least in part on the received location information.

9. The method of claim 8, wherein transmitting signals comprises a time division transmission wherein signals are transmitted from each of region of the plurality of regions at different times.

10. The method of claim 8, wherein transmitting signals comprises transmitting the signals from the plurality or regions simultaneously, the signals transmitted from each region having one of a different frequency or amplitude.

11. The method of claim 8, wherein the electronic device comprises a screen having a plurality of electrodes and further comprising driving subsets of electrodes of the plurality of electrodes corresponding to each region of the plurality of regions.

12. The method of claim 8, wherein transmitting signals comprises transmitting uplink signals in response to detection of the electronic pen within a proximity threshold of the screen of the electronic device.

13. The method of claim 8, further comprising using a lookup table stored at the electronic pen to determine at the electronic pen the location of the electronic pen relative to the screen of the electronic device based at least on the one or more signals.

14. The method of claim 8, further comprising decoding the received one or more signals at the electronic pen and performing triangulation at the electronic pen based on the received one or more signals to determine the location of the electronic pen relative to the screen of the electronic device.

15. One or more computer storage media having computer-executable instructions that, upon execution by a processor, cause the processor to at least:
    transmit signals from a plurality of regions of an electronic device;
    receive location information from an electronic pen in proximity to the electronic device, the location information determined by the electronic pen using one or more of the transmitted signals received by the electronic pen to determine a transmitting region of the electronic device corresponding to a location of the electronic pen relative to a screen of the electronic device, the electronic pen configured to recognize different signals transmitted from the electronic device and decode the different signals to determine the location information, wherein the location information comprises a three-dimensional (3D) location of the electronic pen relative to the electronic device; and
    control a display on the screen of the electronic device based at least in part on the received location information.

16. The one or more computer storage media of claim 15, wherein transmitting signals comprises a time division transmission wherein signals are transmitted from each of region of the plurality of regions at different times.

17. The one or more computer storage media of claim 15, wherein transmitting signals comprises transmitting the signals from the plurality or regions simultaneously, the signals transmitted from each region having one of a different frequency or amplitude.

18. The one or more computer storage media of claim 15, wherein the electronic device comprises a screen having a plurality of electrodes and further comprising driving subsets of electrodes of the plurality of electrodes corresponding to each region of the plurality of regions.

19. The one or more computer storage media of claim 15, wherein transmitting signals comprises transmitting uplink signals in response to detection of the electronic pen within a proximity threshold of the screen of the electronic device.

20. The one or more computer storage media of claim 15 having computer-executable instructions that, upon execution by a processor, further cause the electronic pen to at least use a lookup table stored in the electronic pen to determine at the electronic pen the location of the electronic pen relative to the screen of the electronic device based at least on the one or more signals or perform triangulation to determine the location of the electronic pen relative to the screen of the electronic device.

* * * * *